Sept. 21, 1926.
J. A. MacMURCHY
1,600,346
TURBINE OVERSPEED DEVICE
Filed Jan. 26, 1925
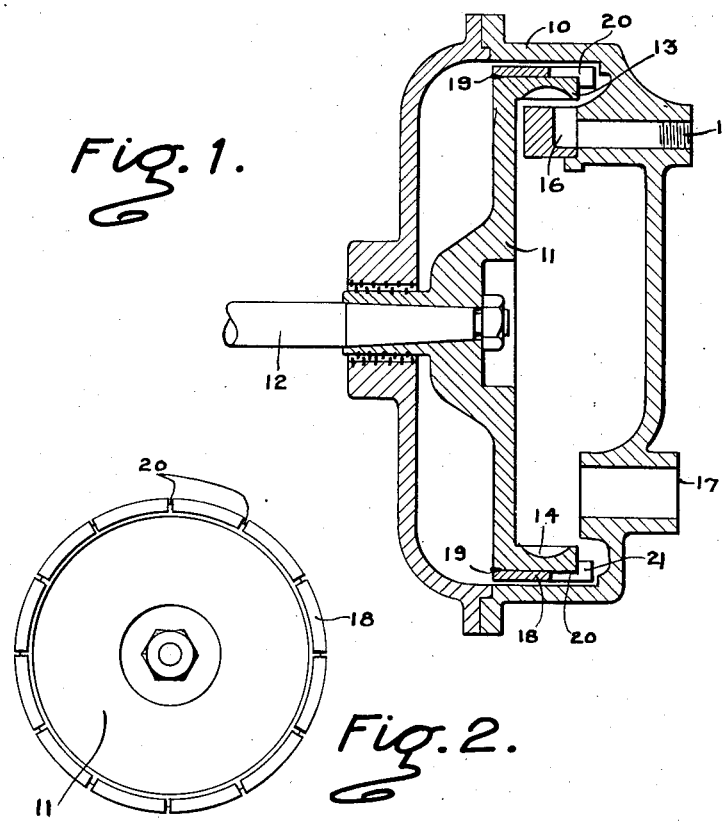
Fig. 1.
Fig. 2.
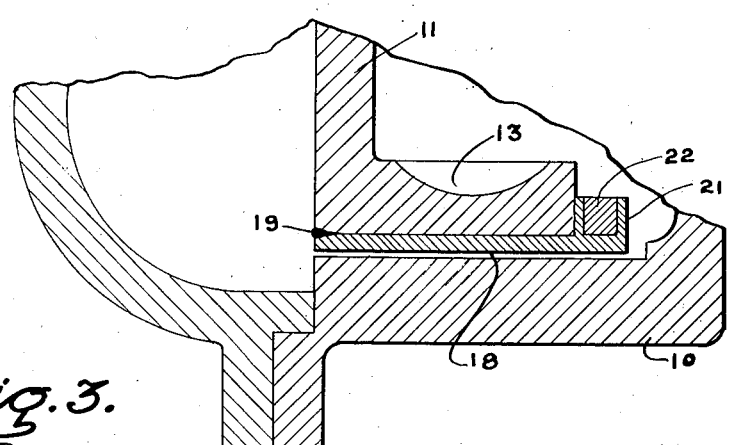
Fig. 3.
WITNESSES:
J.A. MacMurchy
INVENTOR
BY
ATTORNEY Patented Sept. 21, 1926.

1,600,346

UNITED STATES PATENT OFFICE.

JOHN A. MacMURCHY, OF RIDLEY PARK, PENNSYLVANIA, ASSIGNOR TO WESTINGHOUSE ELECTRIC & MANUFACTURING COMPANY, A CORPORATION OF PENNSYLVANIA.

TURBINE OVERSPEED DEVICE.

Application filed January 26, 1925. Serial No. 4,972.

My invention relates to elastic fluid turbines and has for its object to provide a safety device therefor which shall be simple in design, inexpensive to manufacture and reliable of operation.

Appartus embodying features of my invention is illustrated in the accompanying drawings forming a part of this specification, in which Fig. 1 is a sectional view of a turbine showing one form of my invention applied thereto; Fig. 2 is an end view of the turbine rotor shown in Fig. 1; and Fig. 3 is a view showing a modification of my invention.

It has been proposed, in elastic fluid turbines, particularly of the type employed to drive small electric generators such as are employed in locomotive headlighter sets or in oil field illumination, to so construct the rotor of the turbine that, upon the attainment of a predetermined speed above the normal operating speed, the rotor expands and rubs against the turbine casing or some other part of the turbine, exerting a braking effect preventing further increase of speed and consequent rupture of the turbine rotor. This method has proven satisfactory so far as the turbine rotor and its associated parts are concerned, but difficulties have been encountered due to the fact that the generator or other machine which the turbine is driving is unable to withstand the high speed attained by the turbine before expansion of the rotor and rubbing against the casing occurs.

In accordance with my invention, I provide a ring of resilient form surrounding and secured at one edge thereof to the rotor and I make the ring of relatively heavier mass at its free edge. Upon the attainment of a predetermined speed, the heavier mass at the free edge of the ring causes it to expand and to rub against the casing. With this construction a ring of the desired resiliency and mass may be selected which will expand and exert a braking effect at any desired percentage of overspeed of the turbine.

Referring to the drawings for a more detailed description of my invention, I show in Fig. 1 a turbine having a casing 10 and a rotor 11, said rotor being secured to a shaft 12 through which it may drive any suitable machine. The rotor 11 is provided with an overhanging flange 13 having blades 14 milled into its inner periphery. Elastic fluid is admitted through a suitable opening 15 in the casing and is expanded and directed against the blades 13 through a nozzle 16. After having been expanded and directed against the blades 14, the elastic fluid is exhausted from the casing through a suitable exhaust opening 17. Surrounding the outer periphery of the rotor 11 is a ring 18 of resilient material, preferably steel, which is secured to the rotor at one edge, as at 19, by spot weldling or any other suitable means. The ring 18, at its free edge, has a portion 21 of relatively great mass overhanging the flange 13 so that there is at all times during operation a pronounced tendency for the free edge of the ring to move outwardly due to centrifugal force. The ring 18 is closely spaced with respect to the casing 10 so that, upon the attainment of a certain speed, the free edge is expanded sufficiently to rub against the casing 10.

In order that the ring 18 may expand and rub the casing at a relatively lower speed than otherwise, and in order to offset the additional strength provided by the overhanging portion 21, I may provide the ring 18 with a series of slots 20—20 extending from its free edge inwardly as may be better seen by reference to Fig. 2. With the slots 20—20 provided in the ring its free edge comprises a plurality of resilient segments, or fingers free to expand outwardly upon the attainment of the necessary speed.

In accordance with the modification of my invention shown in Fig. 3, I provide the overhanging portion 21 with an annular pocket 22 in which I insert a body of relatively heavier material such as lead, increasing the mass thereof without a material increase in the strength of the ring. It will be apparent by proper proportioning of the pocket 22 and by filling it with material of the requisite weight, that the ring 18 may be caused to expand and rub the casing 10 at any desired speed.

The operation of apparatus made in accordance with my invention is apparent. When the turbine 10 is in operation and running at a normal rate of speed the ring 18 is of sufficient strength to withstand the centrifugal force acting against it and it exerts no braking effect on the rotor 11. Should the rotor 11 attain a speed above normal, determined by the strength of the ring 18, the ring 18 expands outwardly, due to the excessive centrifugal force and rubs the casing 10, exerting a braking effect on the rotor 11 and preventing further increases in speed, thus protecting apparatus driven by the turbine.

From the foregoing, it will be apparent that I have invented a safety device for elastic fluid turbines embodying a member secured to the rotor and adapted to expand and rub the casing, exerting a braking effect, upon the attainment of a predetermined speed.

While I have shown my invention in but two forms, it will be obvious to those skilled in the art that it is not so limited, but is susceptible of various other changes and modifications without departing from the spirit thereof, and I desire, therefore, that only such limitations shall be placed thereupon as are imposed by the prior art or as are specifically set forth in the appended claims.

What I claim is:

1. In a turbine, the combination of a casing, a rotor, and a ring surrounding and carried by the rotor, said ring being adapted to expand and to rub the casing upon the attainment of a predetermined speed of the rotor.

2. In a turbine, the combination of a casing, a rotor, and a ring surrounding the outer periphery of the rotor in closely spaced relation to the casing and having one edge attached to the rotor whereby, upon the attainment of a predetermined speed, its free edge expands and rubs the casing, exerting a braking effect.

3. In a turbine, the combination of a casing, a rotor having relatively close clearance with respect to the casing, said rotor having a ring surrounding the outer periphery thereof, and secured thereto at one edge, said ring having a relatively great mass at its free edge whereby, upon the attainment of a predetermined speed, it expands and rubs the casing.

4. A safety device for a turbine having a casing and a rotor, comprising a ring of relatively greater mass at one edge than at the other, surrounding and secured at its edge of lesser mass to the rotor, whereby upon the attainment of a predetermined speed, it expands at its free edge and rubs the casing.

5. A safety device for the turbine having a casing and a rotor within the casing, comprising a ring of resilient material secured at one edge to the rotor and having its free edge of relatively greater mass and lesser strength, adapted upon the attainment of a predetermined speed to expand and rub the casing.

6. A safety device for a turbine having a casing and a rotor within the casing comprising a ring of resilient material secured at one edge to the rotor in closely spaced relation to the casing, and having its free edge of relatively greater mass, said ring being provided with notches extending inwardly from its free edge.

In testimony whereof, I have hereunto subscribed my name this twenty-first day of January 1925.

JOHN A. MacMURCHY.